(12) United States Patent
Tanaka et al.

(10) Patent No.: US 6,959,208 B2
(45) Date of Patent: Oct. 25, 2005

(54) PORTABLE TERMINAL

(75) Inventors: Eiichi Tanaka, Kawasaki (JP); Yoko Fujii, Kawasaki (JP); Yutaka Kawahigashi, Kawasaki (JP); Katsunori Hayasaka, Kawasaki (JP); Yoshikazu Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 357 days.

(21) Appl. No.: 10/062,771

(22) Filed: Feb. 5, 2002

(65) Prior Publication Data

US 2003/0073467 A1 Apr. 17, 2003

(30) Foreign Application Priority Data

Oct. 16, 2001 (JP) .............................. 2001-318005

(51) Int. Cl.$^7$ .............................................. H04M 1/22
(52) U.S. Cl. ................ 455/567; 455/550.1; 455/575.1; 455/127.6; 455/566; 345/170; 345/168; 379/368
(58) Field of Search ........................ 379/368; 455/567, 455/127.6, 566, 550.1, 575.1; 345/170, 168

(56) References Cited

U.S. PATENT DOCUMENTS 6,310,609 B1 * 10/2001 Morgenthaler .............. 345/170
6,498,600 B1 * 12/2002 Vance et al. ................ 345/168
6,674,854 B1 * 1/2004 Kawano et al. ............. 379/368

FOREIGN PATENT DOCUMENTS

| DK | 1128642 | * | 8/2001 | .......... H04M 1/725 |
| EP | 1085731 A | | 3/2001 | |
| EP | 1128642 A | | 8/2001 | |
| WO | WO97/03432 A | | 1/1997 | |
| WO | WO 00/41378 | * | 7/2000 | ........... H04M 1/22 |
| WO | WO00/41378 A | | 7/2000 | |

* cited by examiner

*Primary Examiner*—Nick Corsaro
*Assistant Examiner*—Alan T. Gantt
(74) *Attorney, Agent, or Firm*—Staas & Halsey LLP

(57) ABSTRACT

In response to key operation, a portable terminal lights up an LCD unit, and also lights up keys only when it is dark around the portable phone by measuring external brightness.

8 Claims, 5 Drawing Sheets

PORTABLE TERMINAL

BACKGROUND OF THE INVENTION

1. Field of the Invention

The present invention relates to a portable terminal such as mobile phone, PHS (Personal Handyphone System) phone, etc. for performing radio communication with a base station.

2. Description of the Related Art

In recent years, mobile phones and PHS phones have explosively prevailed.

These mobile phones, PHS phones, etc. (hereinafter represented by "mobile phone") generally have liquid crystal display (LCD) screens and operation panels on which plural operation buttons are arranged. Also, in recent years, models with larger LCD screens have appeared.

A mobile phone generally has a chargeable secondary battery and operates by obtaining electric power from the secondary battery. It is needless to say that the electric power obtained from the secondary battery is used for performing communication using the mobile phone. But also, the obtained electric power is used for lighting up an LCD screen and operation buttons. Such lighting up requires a lot of electric power.

As an important factor to decide performance of a mobile phone, how a mobile phone can operate for a long time after charging until the next charging can be pointed out.

Generally, when any of operation buttons is pressed, both an LCD screen and a pressed operation button are lighted up and it is possible to confirm contents displayed on the LCD screen and operate the operation buttons in a dark place. However, there is also a model in which it is possible to set that operation buttons are not lighted up in order to save the power.

However, if it is set that operation buttons are not lighted up, a user needs to operate buttons mostly by touching them in the dark. Thus, even though such setting saves the power, operability becomes very poor. On the other hand, if it is set that the operation buttons are lighted up attaching importance to operability, the power is wasted.

SUMMARY OF THE INVENTION

In view of the forgoing, it is an object of the present invention to provide a portable terminal keeping both excellent operability and low power consumption in a high level.

In order to achieve the above object, the present invention provides a portable terminal comprising:

a display unit for displaying a screen;

an operation member for being operated by a user;

a first light for lighting up the display unit;

a second light for lighting up the operation member;

a light sensor for detecting external brightness; and a light control unit for turning on the first light, as well as turning on the second light according to external brightness detected by the light sensor, in response to occurrence of a predetermined first event.

The portable terminal according to the present invention has a sensor to detect external brightness and its second light for lighting up an operation member is turned on according to the external brightness. Therefore, for example, by setting that the operation member is not lighted up when it is bright enough to some extent to fully operate the operation member as well as by lighting up the operation member when it is so dark that the operation member cannot be easily operated, both low power consumption and excellent operability can be maintained.

Also, the portable terminal according to the present invention may comprise, instead of the light control unit, a light control unit for turning on the first light according to external brightness detected by the light sensor as well as turning on the second light according to external brightness detected by the light sensor in response to occurrence of a predetermined first event.

In this case, an external brightness threshold for judging whether the first light should be turned on or not and an external brightness threshold for judging whether the second light should be turned on or not do not need to be the same, and it is preferable to adopt appropriate thresholds respectively.

Here, in the portable terminal according to the present invention, it is preferable that the light control unit turns on the first light with brightness according to external brightness detected by the light sensor.

Although it is difficult to see the display unit when it is too dark, it is also difficult to see the display unit when it is too bright in a dark place in some cases. Therefore, by turning on the first light for lighting up the display unit with brightness according to the external brightness as described above, it is possible to keep the display unit being seen easily all the time without depending on external brightness.

Also, it is preferable that the portable terminal according to the present invention comprises a light emitter for indicating occurrence of a predetermined second event by lighting up or winking;

wherein the light sensor and the light emitter are arranged in proximity to each other; and a window having a light transmitting member which covers and is used for both the light sensor and the light emitter.

Like a mobile phone for example which has a fixed light emitter for indicating an arrival of a call, there are many portable terminals having a function to indicate occurrence of an event by lighting up or winking. If the light sensor according to the present invention is provided in a portable terminal of such type, although it is difficult to avoid increase in the cost caused by the light sensor itself, it is possible to avoid increase in the accompanying costs as much as possible by sharing a window and a light transmitting member as described above, and also the design becomes better than that of a portable terminal which has more than one window.

Here, in the portable terminal according to the present invention, the light control unit may accept operation of the operation member as the first event, and also, the light emitter may accept an arrival of a call as the second event.

DETAILED DESCRIPTION OF PREFERRED EMBODIMENTS

Figure 1:
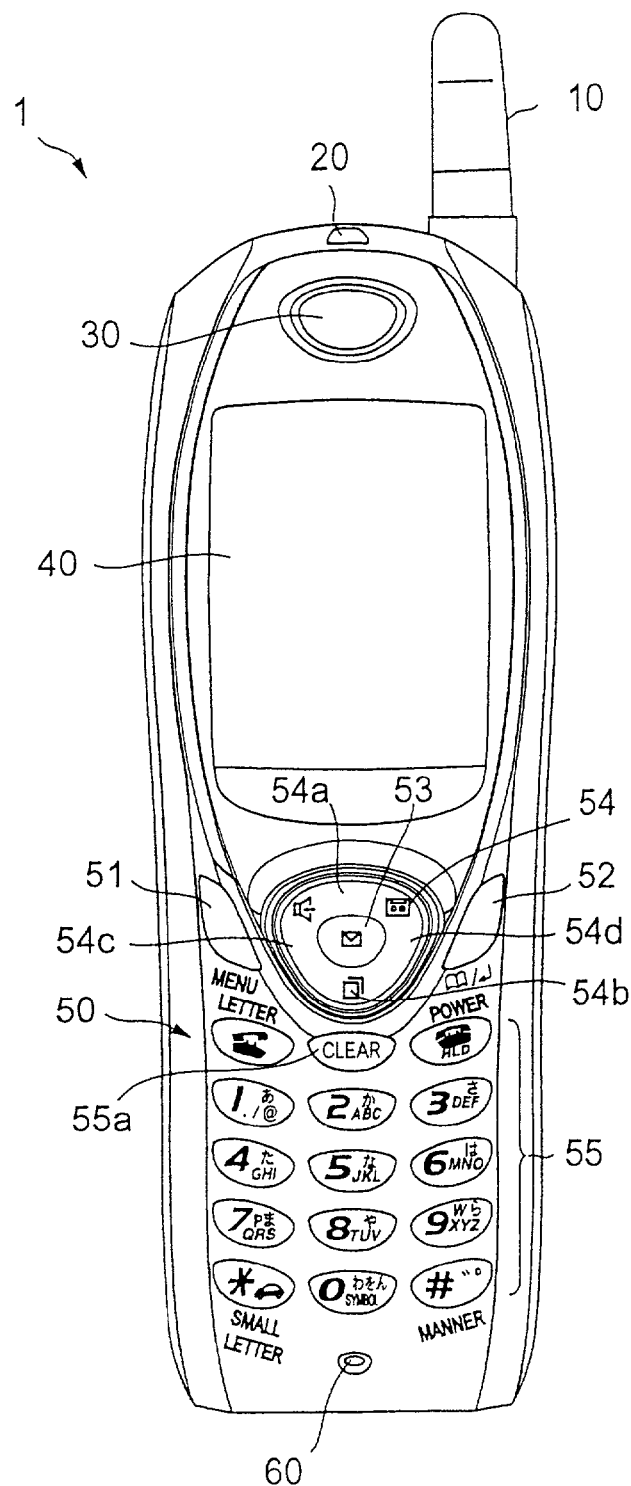
FIG. 1 is an external view of a mobile phone as an example of the portable terminal according to the present invention.

FIG. 1 is an external view of a mobile phone as an example of the portable terminal according to the present invention.

A mobile phone 1 shown in FIG. 1 has, as main components, an antenna 10 for transmitting and receiving radio waves, a light emitting unit 20 with LED in its inside for indicating receipt of a call and a charging state by emitting lights, a message sending unit 30 with a speaker (a speaker 100 shown in FIG. 2) in its inside for hearing a voice by putting it to a near, an LCD unit 40 for displaying various screens, an input operation unit 50 having more than one key, a message receiving unit 60 with a microphone (a microphone 110 shown in FIG. 2) in its inside for picking up a voice of a person, and a terminal for battery charging (not shown) arranged below the message receiving unit 60.

In the light emitting unit 20, there is a window on which a light transmitting member is fixed and which is formed at an aperture provided in a cover of the mobile phone 1, and a bicolor LED 150 composed of a green LED 151 and a red LED 152 and a light sensor 155 are arranged close to each other in the inside of the light emitting unit 20. The light sensor 155 detects brightness around the mobile phone 1. In the upper part of the input operation unit 50, simple push button type keys 51, 52 and 53 are arranged in the left, right and center part respectively, and a key 54 of which structure will be explained later is arranged around the key 53 in the center. That is, the key 54 has a structure having the upper part 54a, the lower part 54b, the left part 54c and the right part 54d that are pushed, and it is possible to perform key inputs by pushing these four parts of the key 54 in distinction from each other.

Also, in the lower part below the part in which the keys 51–54 of the input operation unit 50 are arranged, a group of keys 55 of which number is 15 (3×5=15) is arranged.

Figure 2:
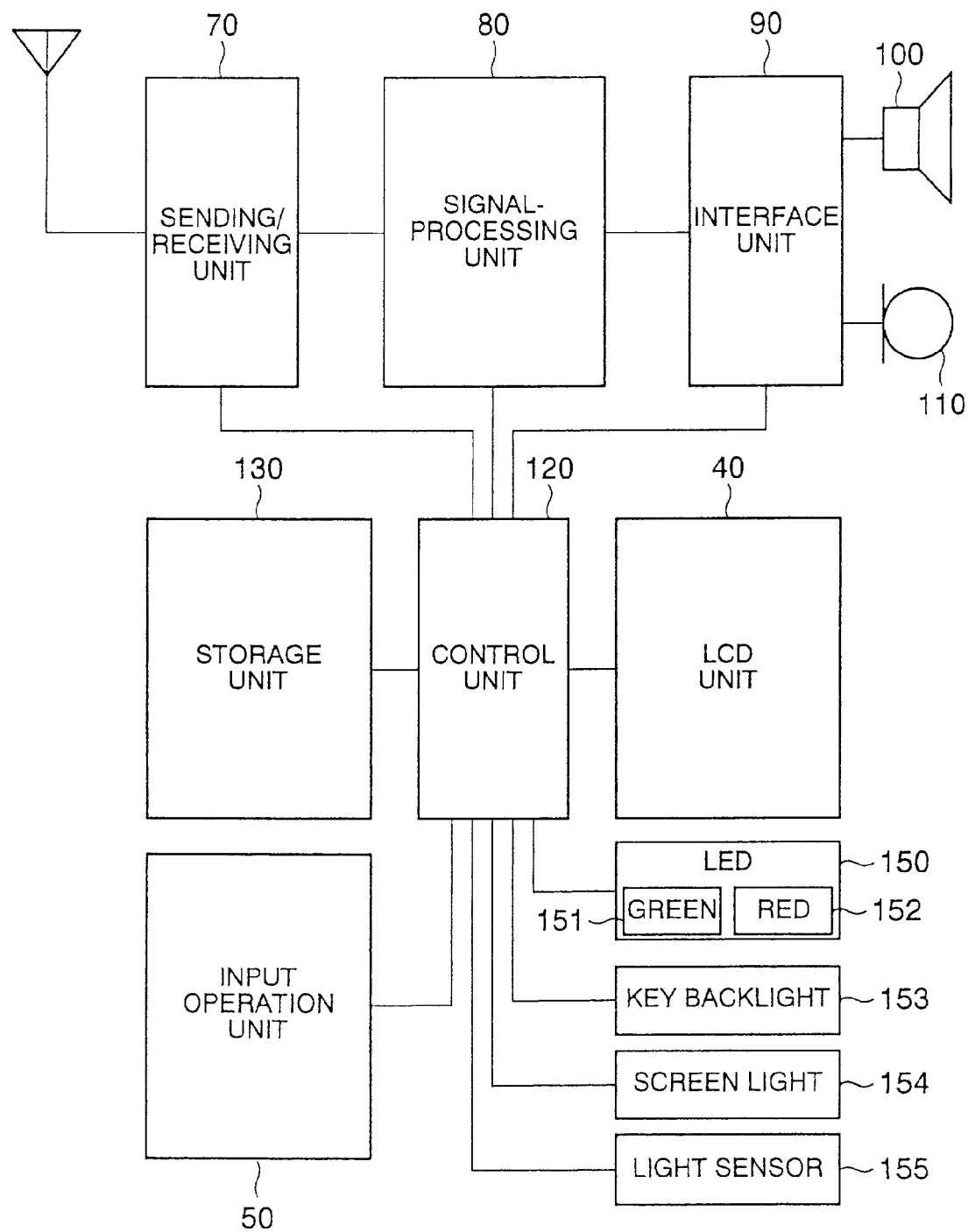
FIG. 2 is a view showing an internal circuit block diagram of the mobile phone of which external view is shown in FIG. 1.

All these keys 51–55 are made of a semitransparent material and can be seen in a dark place as they are lighted up from the inside of the mobile phone 1 by a key backlight 153 shown in a block diagram of FIG. 2.

Moreover, since the LCD unit 40 is also lighted up by a screen light 154 shown in the block diagram of FIG. 2, it is easy to see a screen displayed there.

FIG. 2 is a view showing an internal circuit block diagram of the mobile phone 1 of which external view is shown in FIG. 1.

A radio wave received by the antenna 10 is picked up by a sending/receiving unit 70 to take out a signal that is sent to a signal-processing unit 80.

Also, the sending/receiving unit 70 notifies a control unit 120 of a call when it arrives.

The signal-processing unit 80 divides a signal sent from the sending/receiving unit 70 into a voice signal and an image or a character signal, and sends the voice signal to an interface unit 90 as well as sends the image signal or the character signal to the control unit 120. The interface unit 90 sends the voice signal sent from the signal processing 80 to a speaker 100 and a voice is output from the speaker 100.

On the other hand, when sending a message, a voice signal picked up by a microphone 110 is sent to the sending/receiving unit 70 via the interface unit 90 and the signal-processing unit 80, and the sending/receiving unit 70 converts the voice signal into a signal to be put on a radio wave and sends it to the antenna 10 to emit it as a radio wave into a space.

In a storage unit 130, various voices and screens have been stored and can be additionally stored.

An LCD unit 40 shown in FIG. 2 corresponds to the LCD unit 40 shown in FIG. 1, and an input operation unit 50 shown in FIG. 2 corresponds to the input operation unit 50 shown in FIG. 1.

The control unit 120 reads out a receipt-waiting screen from the storage unit 130 and displays it on the LCD unit 40 in a receipt waiting state. When notified about an arrival of a call by the sending/receiving unit 70, in order to indicate the arrival of a call, the control unit 120 reads out a receipt melody from the storage unit 130 to let the speaker 100 make the sound of the receipt melody via the signal-processing unit 80 and the interface unit 90, as well as uses a light by turning on the green LED 151 of the bicolor LED 150. Further, when notified about an arrival of a call, the control unit 120 turns on the screen light 154 to light up the LCD unit 40 and turns on the key backlight 153 when it is dark around the mobile phone.

Also, the control unit 120 makes calls according to operations in the input operation unit 50, stores various setting conditions to be made according to operations performed on the input operation unit 50 in the storage unit 130, or controls display screens in the LCD unit 40. Further, during a battery (not shown) is being charged up, the control unit 120 notifies a user of a charging state by turning on the red LED 152 of the bicolor LED 150.

Figure 3:
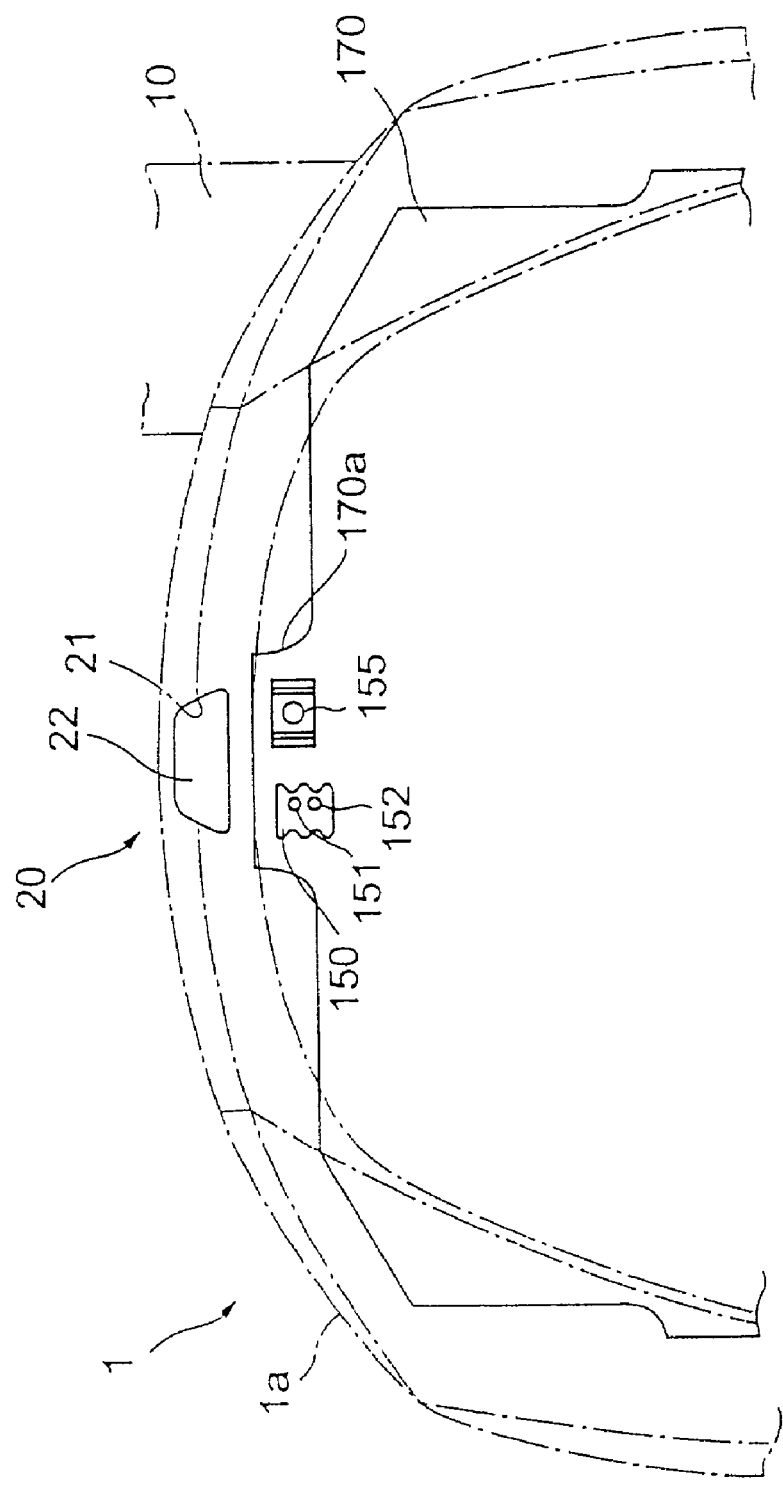
FIG. 3 is a view showing a structure of a light emitting unit of the mobile phone shown in FIG. 1.

FIG. 3 is a view showing a structure of a light emitting unit 20 of the mobile phone 1 shown in FIG. 1.

A circuit board 170 is provided in the inside of a body 1a of the mobile phone 1, and the bicolor LED 150 and the light sensor 155 are arranged close to each other in a partially protruding part 170a of the circuit board 170. Also, the body 1a of the mobile phone 1 has an aperture 21 in which a window is formed, and a lens 22 made of a semitransparent light transmitting material is fit into the window.

When the green LED 151 or the red LED 152 of the bicolor LED 150 is turned on, the entire lens brightens up showing the color of the turned-on LED so that a user can notice an arrival of a call or a charging state.

Also, the light sensor 155 is irradiated by an external light via the lens 22 and detects external brightness.

In the present embodiment, the bicolor LED 150 and the light sensor 155 are arranged close to each other so that only one lens that is the lens 22 can be used. Therefore, the cost of a material and manufacturing with respect to the lens is lower and the design is better than the case that the bicolor LED 150 and the light sensor 155 are respectively arranged in separate positions.

Figure 4:
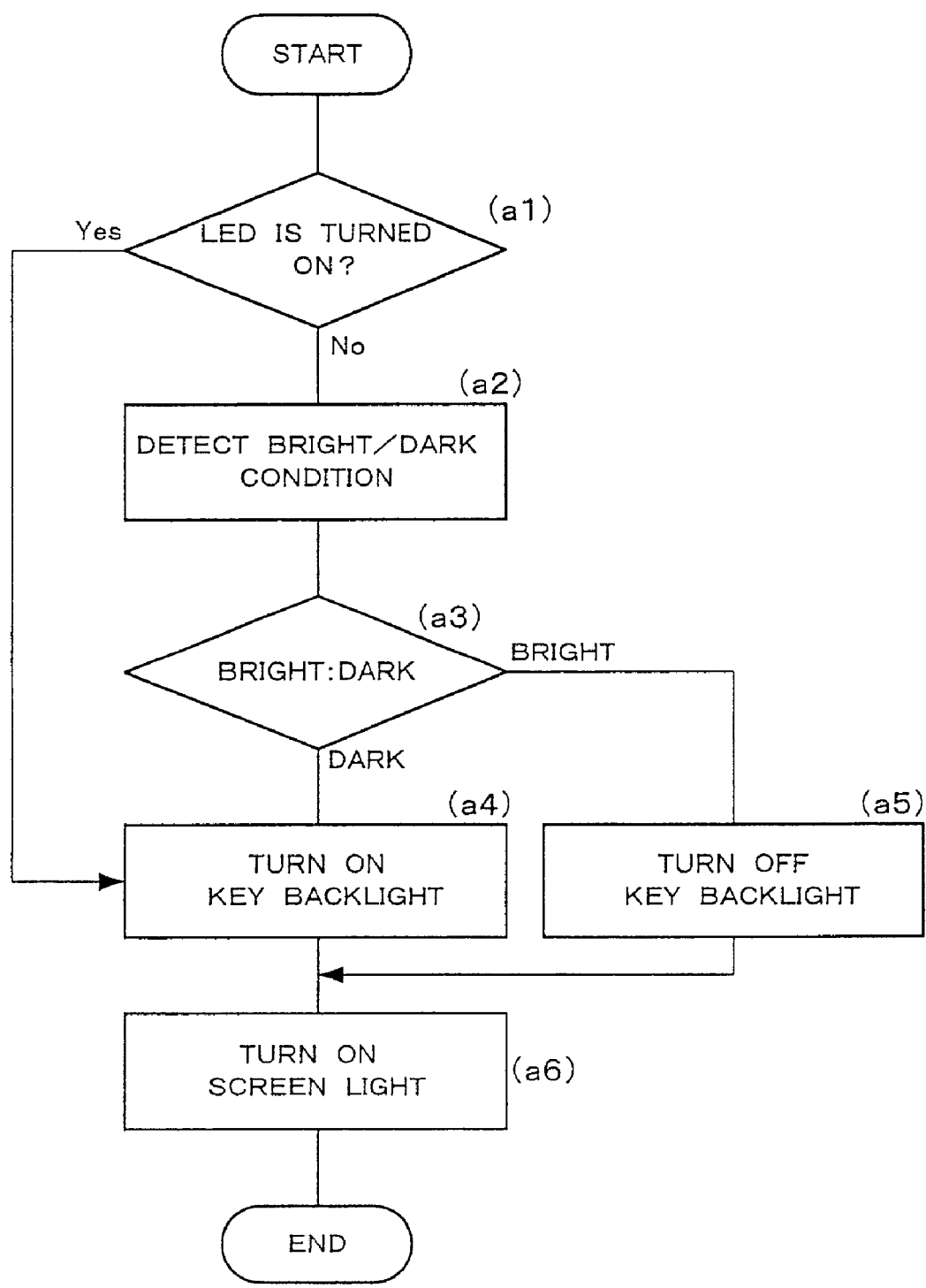
FIG. 4 is a flowchart showing a routine operating in a control unit shown in FIG. 2.

FIG. 4 is a flowchart showing a routine operating in the control unit 120 shown in FIG. 2.

The routine shown in FIG. 4 is executed when there is a call arriving in the mobile phone 1 or when any of keys composing the input operation unit 50 is operated.

Here, at first, whether the green LED 151 or the red LED 152 of the bicolor LED 150 is turned on or not is detected. As described above, turning on the green LED 151 means an arrival of a call and turning on the red LED 152 means a charging state. Note that control of turning on the green LED 151 when a call arrives and control of turning on the red LED 152 in a charging state are executed by another routine different from the routine shown in FIG. 4. The detail explanation for such control will be omitted here.

In a state that an LED is turned on, the key backlight 153 is turned on (step a4), and further the screen light 154 is turned on.

That is, in the mobile phone according to the present embodiment, when a call arrives and in a charging state, both the LCD unit 40 and the input operation unit 50 are lighted up.

On the other hand, when it is judged that an LED is turned on, external brightness is detected by the light sensor 155, and whether the detected brightness is brighter than a predetermined brightness (a threshold) is judged (step a3). When it is darker than the threshold, the key backlight 153 is turned on (step a4), and further the screen light 154 is turned on (step a6). On the contrary, when it is brighter than the threshold, the key backlight 153 is turned off (or kept as it is in a turned-off state) (step a5), and only the screen light 154 is turned on (step a6).

That is, here, when the input operation unit 50 is operated, both the LCD unit 40 and the input operation unit 50 are lighted up when it is dark outside the mobile phone and only the LCD unit 40 is lighted up when it is bright outside the mobile phone. Therefore, power consumption is suppressed as the input operation unit 50 is turned off when it is bright outside the mobile phone, and excellent operability is secured as input operation unit 50 is lighted up when it is dark outside the mobile phone.

Figure 5:
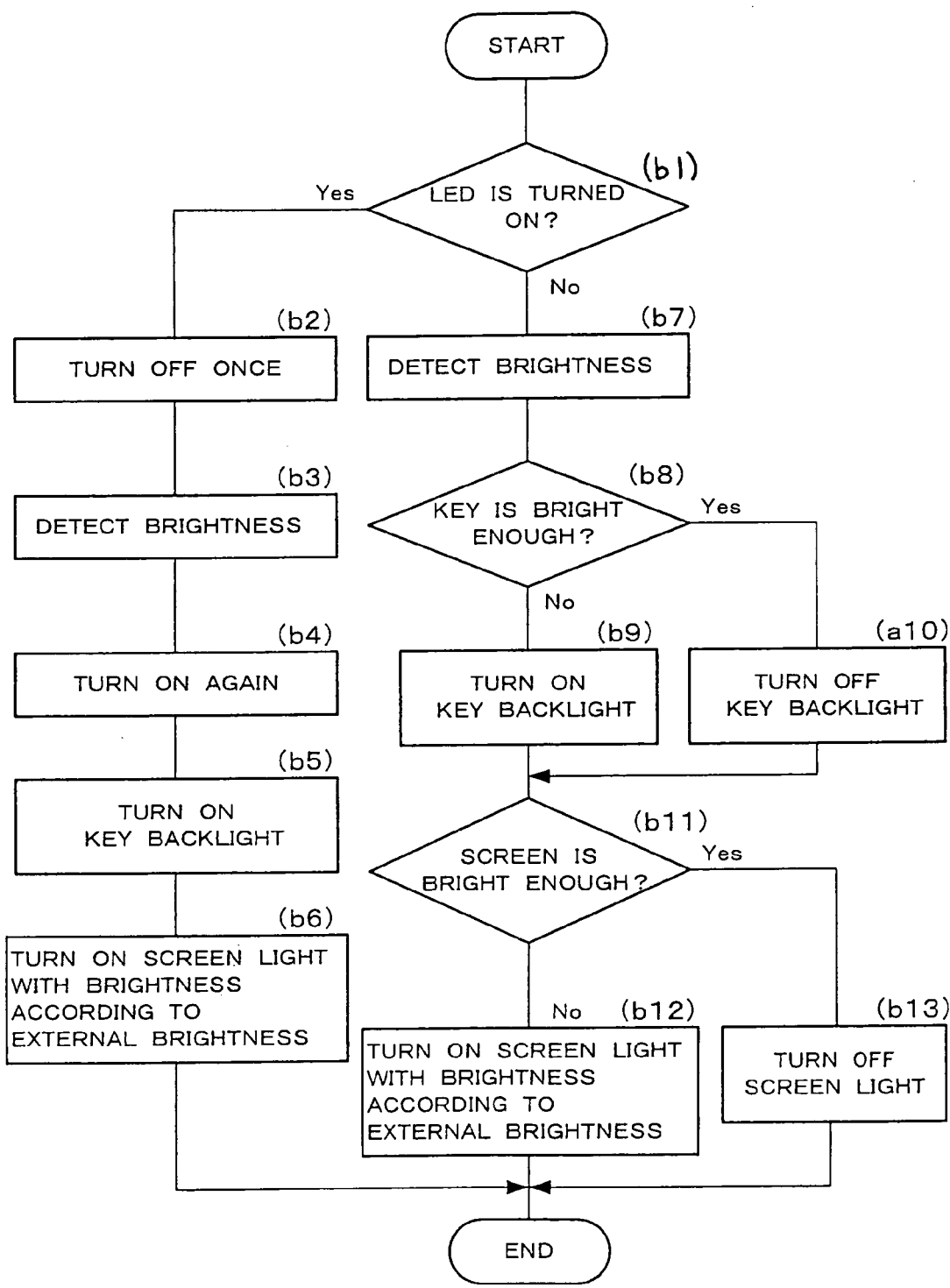
FIG. 5 is a flowchart showing another routine that can be adopted instead of the routine shown in FIG. 4.

FIG. 5 is a flowchart showing another routine that can be adopted instead of the routine shown in FIG. 4.

As to a mobile phone in which the routine shown in FIG. 5 is executed, brightness in lighting up the LCD unit 40 by the screen light 154 shown in FIG. 2 can be adjusted by the control of the control unit 120.

The routine shown in FIG. 5 is also executed by either an arrival of a call or operation of the input operation unit.

First, whether either the green LED 151 or the red LED 152 of the bicolor LED is turned on or not is judged (step b1).

When an LED has been turned on, the LED is turned off once (step b2), external brightness is detected by the light sensor 155 (step b3), the LED turned off at step b2 is turned on again (step b4), the key backlight 153 is turned on to light up each key of the input operation unit (step b5), and the screen light 154 is turned on with brightness according to the detected external brightness at step b3 to light up the LCD unit 40 according to the brightness of the screen light 154 (step b6).

Here, the reason why the LED is turned off once at step b2 is that, if the LED keeps being turned on, the light of the LED is reflected or scattered at the lens 22 and enters the light sensor 155, and therefore, external brightness cannot be detected.

Also, if it is judged that the LED has been turned off at step b1 shown in FIG. 5, external brightness is detected by the light sensor 155 (step b7), and whether the detected external brightness is bright enough to operate keys is judged (step b8). When it is dark outside the mobile phone and it is inconvenient to operate keys, the key backlight 153 is turned on (step b9), and when it is bright enough outside the mobile phone to operate keys, the key backlight 153 is turned off (or kept in a turned-off state) (step b10). Further, whether the detected external brightness at step b7 is bright enough to see a screen displayed on the LCD unit 40 or not is judged (step b11). And then, the screen light 154 is turned off (or kept in a turned-off state) when it is bright enough to see a screen displayed on the LCD unit 40 (step b13), or the screen light 154 is turned on with brightness according to the external brightness to light up the LCD unit 40 with the brightness of the screen light 154 when it is not bright enough to see a screen displayed on the LCD unit 40 (step b12), so that a screen displayed on the LCD unit 40 can be always seen with appropriate brightness without depending upon external brightness.

The reason why the screen light 154 is turned on with brightness according to external brightness is to solve the problem that, when the mobile phone is operated in the dark for example, the LCD unit 40 cannot be seen well because the LCD unit 40 is too bright. Therefore, by lighting it up with brightness according to external brightness, it is possible to keep the LCD unit 40 being easily seen all the time.

In this way, besides judging whether the input operation unit 50 is lighted up according to external brightness or not, it is also acceptable to judge whether the LCD unit 40 is lighted up according to external brightness or not, and further it is acceptable to change brightness in lighting up the LCD unit 40 according to external brightness when it is lighted up.

Although the present embodiment as described above is an example of the present invention applied to a mobile phone, it is also possible to widely apply the present invention to PHS phone or other portable terminals.

As described above, according to the present invention, both excellent operability and low power consumption can be achieved in a high level.

What is claimed is:

1. A portable terminal comprising:
    a display unit for displaying a screen;
    an operation member for being operated by a user;
    a first light for lighting up the display unit;
    a second light for lighting up the operation member;
    a light sensor for detecting brightness of light external to the portable terminal;
    a light control unit for turning on the first light, as well as turning on the second light according to the brightness of the external light detected by the light sensor, in response to occurrence of a predetermined first event;
    a light emitter for generating a light indicating occurrence of a predetermined second event;
    wherein the light sensor and the light emitter are arranged in proximity to each other; and
    a window having a light transmitting member which covers both the light sensor and the light emitter, allows the external light to pass from the external of the portable terminal to the light sensor, and allows light generated by the light emitter to pass from the light emitter to the external of the portable terminal.

2. The portable terminal according to claim 1 wherein the light control unit turns on the first light according to brightness of the external light detected by the light sensor turning and turns on the second light according to brightness of the external light detected by the light sensor in response to occurrence of a predetermined first event.

3. The portable terminal according to claim 2 wherein the light control unit accepts operation of the operation member as the first event.

4. The portable terminal according to claim 2 wherein the light emitter accepts an arrival of a call as the second event.

5. The portable terminal according to claim 1 wherein the light control unit accepts operation of the operation member as the first event.

6. The portable terminal according to claim 1 wherein the light emitter accepts an arrival of a call as the second event.

7. A portable terminal comprising:
    a display unit for displaying a screen;
    an operation member for being operated by a user;
    a first light for lighting up the display unit;
    a second light for lighting up the operation member;

a light sensor for detecting brightness of light external to the portable terminal;

a light control unit for turning on the first light, as well as turning on the second light according to the brightness of the external light detected by the light sensor, in response to occurrence of a predetermined first event; and a light emitter, separate from the first and second lights, for generating a light indicating occurrence of a predetermined second event;

wherein the light sensor and the light emitter are arranged in proximity to each other; and a window having a light transmitting member which covers both the light sensor and the light emitter, allows the external light to pass from the external of the portable terminal to the light sensor, and allows light generated by the light emitter to pass from the light emitter to the external of the portable terminal.

8. A portable terminal comprising:

a display unit for displaying a screen;

an operation member for being operated by a user;

a first light for lighting up the display unit;

a second light for lighting up the operation member;

a light sensor for detecting brightness of light external to the portable terminal;

a light control unit for turning on the first light, as well as turning on the second light according to the brightness of the external light detected by the light sensor, in response to occurrence of a predetermined first event;

a light emitter for generating a light indicating occurrence of a predetermined second event;

wherein the light sensor and the light emitter are arranged in proximity to each other;

a window having a light transmitting member which covers both the light sensor and the light emitter, allows the external light to pass from the external of the portable terminal to the light sensor, and allows light generated by the light emitter to pass from the light emitter to the external of the portable terminal; and the window being separate from the display unit.

* * * * *